(12) United States Patent
Rasovsky et al.

(10) Patent No.: US 12,171,627 B2
(45) Date of Patent: Dec. 24, 2024

(54) DENTAL ARTICULATOR WITH QUALITY CONTROL FEATURES

(71) Applicant: Align Technology, Inc., San Jose, CA (US)

(72) Inventors: Leon Rasovsky, Mountain View, CA (US); Avi Kopelman, Palo Alto, CA (US); Nir Makmel, Tel Aviv (IL)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 17/719,704

(22) Filed: Apr. 13, 2022

(65) Prior Publication Data

US 2022/0331075 A1 Oct. 20, 2022

Related U.S. Application Data

(60) Provisional application No. 63/175,320, filed on Apr. 15, 2021.

(51) Int. Cl.
| | |
|---|---|
| *A61C 11/00* | (2006.01) |
| *A61C 7/00* | (2006.01) |
| *A61C 13/00* | (2006.01) |
| *A61C 7/08* | (2006.01) |
| *A61C 9/00* | (2006.01) |

(52) U.S. Cl.
CPC .......... *A61C 13/0004* (2013.01); *A61C 7/002* (2013.01); *A61C 11/00* (2013.01); *A61C 7/08* (2013.01); *A61C 9/0046* (2013.01)

(58) Field of Classification Search
CPC ....... A61C 11/00; A61C 11/02; A61C 11/027; A61C 11/003; A61C 11/005; A61C 11/08; A61C 11/081; A61C 11/084; A61C 11/085
USPC .............................. 433/49, 50, 53, 54, 56–69
See application file for complete search history.

(56) References Cited

U.S. PATENT DOCUMENTS

| | | | | | |
|---|---|---|---|---|---|
| 2,724,899 | A | * | 11/1955 | Stoll ....................... | A61C 11/02 33/513 |
| 3,106,779 | A | * | 10/1963 | Seaman ................. | A61C 19/04 33/513 |
| 3,159,915 | A | * | 12/1964 | Beu ....................... | A61C 11/022 433/59 |
| 3,466,750 | A | * | 9/1969 | Timberlake ............ | A61C 11/02 433/67 |

(Continued)

*Primary Examiner* — Jan Christopher L Merene
*Assistant Examiner* — Kylie M. Gaspar
(74) *Attorney, Agent, or Firm* — Lowenstein Sandler LLP

(57) ABSTRACT

A dental articulator includes a first arm hingedly joined to a second arm about a pivot axis, where each one of the first arm and the second arm are configured to mount a dental model comprising at least one measurement element, and an inspection tool capable of checking the at least one measurable element against allowable tolerances. Each arm includes a mounting bracket having a distal portion adapted to mount the respective dental model and having a proximal portion. Each arm further has a base member having a distal portion adapted to hingedly join the first arm and the second arm about the pivot axis. The inspection tool comprises a first measurement device and a second measurement device. The first measurement device is coupled to the first arm or second arm and the second measurement device is coupled to the first arm or second arm.

11 Claims, 8 Drawing Sheets

(56) References Cited

U.S. PATENT DOCUMENTS

| | | | | |
|---|---|---|---|---|
| 3,510,947 | A * | 5/1970 | Tuccillo | A61C 11/08 433/60 |
| 3,772,788 | A * | 11/1973 | Gerber | A61C 11/022 433/67 |
| 4,449,930 | A * | 5/1984 | Huffman | A61C 11/02 433/64 |
| 4,659,311 | A * | 4/1987 | Raskin | A61C 11/02 433/55 |
| 4,744,751 | A * | 5/1988 | Finkelstein | A61C 11/08 433/65 |
| 5,320,528 | A * | 6/1994 | Alpern | A61C 11/022 433/59 |
| 5,366,373 | A * | 11/1994 | Mumolo | A61C 11/022 433/58 |
| 5,431,564 | A * | 7/1995 | Guichet | A61C 11/022 433/56 |
| 5,482,460 | A * | 1/1996 | Farnor, Jr. | A61C 11/02 433/64 |
| 5,622,497 | A * | 4/1997 | Cho | A61C 11/02 433/48 |
| 5,788,489 | A * | 8/1998 | Huffman | A61C 9/002 433/60 |
| 6,152,731 | A * | 11/2000 | Jordan | A61C 13/0003 433/69 |
| 6,334,853 | B1 | 1/2002 | Kopelman et al. | |
| 6,551,102 | B1 * | 4/2003 | Morales | A61C 11/08 433/54 |
| 6,845,175 | B2 | 1/2005 | Kopelman et al. | |
| 6,957,118 | B2 | 10/2005 | Kopelman et al. | |
| 7,112,065 | B2 | 9/2006 | Kopelman et al. | |
| 7,220,124 | B2 | 5/2007 | Taub et al. | |
| 7,236,842 | B2 | 6/2007 | Kopelman et al. | |
| 7,333,874 | B2 | 2/2008 | Taub et al. | |
| 7,338,283 | B2 * | 3/2008 | Honstein | A61C 11/02 433/57 |
| 7,361,020 | B2 | 4/2008 | Abolfathi et al. | |
| 7,442,040 | B2 | 10/2008 | Kuo | |
| 7,536,234 | B2 | 5/2009 | Kopelman et al. | |
| 7,555,403 | B2 | 6/2009 | Kopelman et al. | |
| 7,762,810 | B2 * | 7/2010 | Sildve | A61C 9/0006 433/56 |
| 7,766,658 | B2 | 8/2010 | Tricca et al. | |
| 7,862,336 | B2 | 1/2011 | Kopelman et al. | |
| 7,871,269 | B2 | 1/2011 | Wu et al. | |
| 7,947,508 | B2 | 5/2011 | Tricca et al. | |
| 8,087,933 | B2 * | 1/2012 | Garland | A61C 9/00 433/61 |
| 8,092,215 | B2 | 1/2012 | Stone-Collonge et al. | |
| 8,244,028 | B2 | 8/2012 | Kuo et al. | |
| 8,382,474 | B2 * | 2/2013 | Boltanski | A61C 11/027 433/57 |
| 8,509,932 | B2 | 8/2013 | Kopelman | |
| 8,807,999 | B2 | 8/2014 | Kuo et al. | |
| 9,375,298 | B2 | 6/2016 | Boronkay et al. | |
| 9,408,679 | B2 | 8/2016 | Kopelman | |
| 9,492,243 | B2 | 11/2016 | Kuo | |
| 9,763,758 | B2 | 9/2017 | Kopelman | |
| 10,016,262 | B2 | 7/2018 | Sabina et al. | |
| 10,952,816 | B2 | 3/2021 | Kopelman | |
| 11,389,123 | B2 * | 7/2022 | Du Preez | A61B 6/4291 |
| 2004/0013997 | A1 * | 1/2004 | Jung | A61C 11/00 433/57 |
| 2005/0106529 | A1 | 5/2005 | Abolfathi et al. | |
| 2006/0115785 | A1 | 6/2006 | Li et al. | |
| 2006/0204921 | A1 * | 9/2006 | Uhm | A61C 11/084 433/64 |
| 2006/0228665 | A1 * | 10/2006 | Garland | A61C 11/02 433/60 |
| 2008/0138763 | A1 * | 6/2008 | Fernandez | A61C 11/08 433/54 |
| 2008/0138767 | A1 | 6/2008 | Kuo et al. | |
| 2008/0286716 | A1 | 11/2008 | Sherwood | |
| 2008/0286717 | A1 | 11/2008 | Sherwood | |
| 2012/0219936 | A1 * | 8/2012 | Furuki | G09B 23/283 434/264 |
| 2014/0080088 | A1 * | 3/2014 | Kim | A61C 9/002 433/57 |
| 2014/0220504 | A1 * | 8/2014 | Kim | A61C 11/08 433/57 |

\* cited by examiner

DENTAL ARTICULATOR WITH QUALITY CONTROL FEATURES

RELATED APPLICATION

This application claims the benefit of U.S. Provisional Application No. 63/175,320, filed Apr. 15, 2021, the entire content of which is hereby incorporated by reference.

TECHNICAL FIELD

Embodiments of the present disclosure relate to the field of orthodontics and dentistry and, in particular, to dental articulators with quality control features. Embodiments further relate to a system and method for adding quality control features to design models of human jaws.

BACKGROUND

Dental articulators are tools used by dental practitioners with dental models for producing, developing, or testing dental prostheses or dentures. Articulators are generally meant to provide a relative spatial relationship between the upper and lower jaws, often providing the dental practitioner with valuable occlusal information, and are hinged to enable the upper and lower dental models to rotate with respect to one another in a manner that may be analogous to that of a real jaw.

Conventionally, the dental models are made from plaster. However, advancements in three-dimensional (3D) printing have enabled dental practitioners and technicians to fabricate dental models using a 3D printer and using a milling machine. 3D printers may fabricate 3D objects through an additive or subtractive (milling) process, and generated products may vary in quality based on the 3D printer and its 3D printing technique. This may lead to 3D fabricated dental models having incorrect specifications, deformations, distortions, etc., causing the patient to receive an improper prostheses and experience postponements in treatment due to re-fabrication delays.

SUMMARY

In a first aspect of the disclosure, a dental articulator includes a first arm hingedly joined to a second arm about a pivot axis, each one of the first arm and the second arm configured to mount a dental model comprising at least one measurement element and an inspection tool capable of checking the at least one measurable element against allowable tolerances. Each of the first arm and the second arm include a mounting bracket having a distal portion adapted to mount the respective dental model and having a proximal portion, and a base member having a distal portion adapted to hingedly join the first arm and the second arm about the pivot axis, and a proximal portion adapted to couple to the proximal portion of the respective mounting bracket. The inspection tool includes a first measurement device and a second measurement device, wherein the first measurement device is coupled to the first arm or the second arm and the second measurement device is coupled to the first arm or the second arm.

A second aspect of the disclosure may further extend the first aspect of the disclosure. In the second aspect of the disclosure, the inspection tool is designed to perform a go/no-go test of the at least one measurement element.

A third aspect of the disclosure may further extend the first aspect of the disclosure. In the third aspect of the disclosure, the first measurement device comprises a first aperture in the base member of the first arm or the second arm, and the second measurement device comprises a second aperture in the base member of the first arm or the second arm.

A fourth aspect of the disclosure may further extend the third aspect of the disclosure. In the fourth aspect of the disclosure, the first aperture is of a first dimension and the second aperture is of a second dimension.

A fifth aspect of the disclosure may further extend the first aspect of the disclosure. In the fifth aspect of the disclosure, the first measurement device comprises a first notch in a side of the base member of the first arm or the second arm, and the second measurement device comprises a second notch in a side of the base member of the first arm or the second arm.

A sixth aspect of the disclosure may further extend the fifth aspect of the disclosure. In the sixth aspect of the disclosure, the first notch is of a first dimension and the second notch is of a second dimension.

A seventh aspect of the disclosure may further extend the first aspect of the disclosure. In the seventh aspect of the disclosure, the first measurement device comprises a first pair of protrusions coupled to a side of the base member of the first arm or the second arm, and the second measurement device comprises a second pair of protrusions coupled to a side of the base member of the first arm or the second arm An eighth aspect of the disclosure may further extend the seventh aspect of the disclosure. In the eighth aspect of the disclosure, the first pair of protrusions are of a first distance from each other and the second pair of protrusions are of a second distance from each other.

A ninth aspect of the disclosure may further extend the first aspect of the disclosure. In the ninth aspect of the disclosure, the at least one measurement element comprises a cylindrical protrusion.

A tenth aspect of the disclosure may further extend the first aspect of the disclosure. In the tenth aspect of the disclosure, the dental model and the at least one measurement element are fabricated using a three-dimensional printer.

An eleventh aspect of the disclosure may further extend the first aspect of the disclosure. In the eleventh aspect of the disclosure, the inspection tool further comprises a third measurement device and a fourth measurement device, wherein the first measurement device and the second measurement device are designed to measure a first measurement element of the at least one measurement element, and wherein the third measurement device and the fourth measurement device are designed to measure a second measurement element of the at least one measurement element, wherein the first measurement element has first dimensions that are different from second dimensions of the second measurement element.

In a $12^{th}$ aspect of the disclosure, a method includes receiving, by a processor, a digital file comprising a design model representative of an upper human jaw or a lower human jaw, generating at least one measurement element on the design model, and updating the digital file comprising the design model with the at least one measurement element. The digital file comprises a set of instructions to be executed by a three-dimensional (3D) printer to fabricate a dental model with the at least one measurement element based on the design model. The at least one measurement element is measureable to perform a quality assessment of the dental model.

A $13^{th}$ aspect of the disclosure may further extend the $12^{th}$ aspect of the disclosure. In the $13^{th}$ aspect of the disclosure, the at least one measurement element comprises a protrusion capable of being measured by a mechanical measuring device.

A 14th aspect of the disclosure may further extend the 12th aspect of the disclosure. In the 14th aspect of the disclosure, the at least one measurement element is automatically generated based on at least one of a type of design model or one or more properties of the design model.

A 15th aspect of the disclosure may further extend the 12th aspect of the disclosure. In the 15th aspect of the disclosure, the at least one measurement element is generated based on a type of articulator the dental model is to be affixed to.

A 16th aspect of the disclosure may further extend the 12th aspect of the disclosure. In the 16th aspect of the disclosure, the at least one measurement element is automatically generated at a predetermined location on the design model.

A 17th aspect of the disclosure may further extend the 12th aspect of the disclosure. In the 17th aspect of the disclosure, the method includes receiving user input indicating a placement of the measurement element on the design model and placing the measurement element on the design model based on the user input.

An 18th aspect of the disclosure may further extend the 12th aspect of the disclosure. In the 18th aspect of the disclosure, the method further including automatically determining a placement of the measurement element on the design model that will not interfere with a functionality of a dental appliance to be fabricated using the dental model and placing the measurement element on the design model based on the automatically determined placement.

A 19th aspect of the disclosure may further extend the 12th aspect of the disclosure. In the 19th aspect of the disclosure, the method further including causing the 3D printer to fabricate the dental model with the at least one measurement element based on the set of instructions.

A 20th aspect of the disclosure may further extend the 19th aspect of the disclosure. In the 20th aspect of the disclosure, the method further including measuring the at least one measurement element using a mechanical measuring device.

A 21st aspect of the disclosure may further extend the 12th aspect of the disclosure. In the 21st aspect of the disclosure, the method further including providing a library of available measurement elements in a user interface and receiving a user selection of the at least one measurement element from the library of available measurement elements.

A 22nd aspect of the disclosure may include a computer readable medium comprising instructions that, when executed by a processor, cause the processing device to perform operations include generating, by the processor, a design model representative of an upper human jaw or a lower human jaw, determining at least one measurement element to be added to the design model, determining a placement of the at least one measurement element on the design model, updating the design model to include the at least one measurement element at the determined placement on the design model; and generating a digital file comprising the design model with the at least one measurement element, wherein the digital file comprises a set of instructions to be executed by a three-dimensional (3D) printer to fabricate a dental model with the at least one measurement element based on the design model, wherein the at least one measurement element is measureable to perform a quality assessment of the dental model.

A 23rd aspect of the disclosure may further extend the 22nd aspect of the disclosure. In the 23rd aspect of the disclosure, the at least one measurement element comprises a protrusion capable of being measured by a mechanical measuring device.

A 24th aspect of the disclosure may further extend the 22nd aspect of the disclosure. In the 24th aspect of the disclosure, the determining of the at least one measurement element to be added to the design model and the determining of the placement of the at least one measurement element on the design model are performed automatically based on at least one of a type of design model or one or more properties of the design model.

A 25th aspect of the disclosure may further extend the 22nd aspect of the disclosure. In the 25th aspect of the disclosure, the operations further include providing a library of available measurement elements in a user interface and receiving a user selection of the at least one measurement element from the library of available measurement elements.

A 26th aspect of the disclosure may further extend the 22nd aspect of the disclosure. In the 26th aspect of the disclosure, the operations further include receiving user input indicating the placement of the measurement element on the design model, wherein the placement of the measurement element on the design model is determined based on the user input.

A 27th aspect of the disclosure may further extend the 22nd aspect of the disclosure. In the 27th aspect of the disclosure, determining the placement of the at least one measurement element on the design model includes automatically determining the placement of the measurement element on the design model that will not interfere with a functionality of a dental appliance to be fabricated using the dental model.

A 28th aspect of the disclosure includes a system comprising a memory device and a processing device, operatively coupled to the memory device, to perform operations including receiving a digital file comprising a design model representative of an upper human jaw or a lower human jaw, generating at least one measurement element on the design model, and updating the digital file comprising the design model with the at least one measurement element. The digital file comprises a set of instructions to be executed by a three-dimensional (3D) printer to fabricate a dental model with the at least one measurement element based on the design model. The at least one measurement element is measureable to perform a quality assessment of the dental model.

A 29th aspect of the disclosure may further extend the 28th aspect of the disclosure. In the 29th aspect of the disclosure, the at least one measurement element comprises a protrusion capable of being measured by a mechanical measuring device.

A 30th aspect of the disclosure may further extend the 28th aspect of the disclosure. In the 30th aspect of the disclosure, the at least one measurement element is automatically generated based on a type of design model generated.

A 31st aspect of the disclosure may further extend the 28th aspect of the disclosure. In the 31st aspect of the disclosure, the at least one measurement element is generated based on a type of articulator the dental model is to be affixed to.

A 32nd aspect of the disclosure may further extend the 28th aspect of the disclosure. In the 32nd aspect of the disclosure, wherein the at least one measurement element is automatically generated at a predetermined location on the design model.

A 33rd aspect of the disclosure includes kit for testing dental models. The kit includes a dental articulator comprising a first arm hingedly joined to a second arm about a pivot axis, each one of the first arm and the second arm configured to mount a dental model comprising at least one measurement element. Each of the first arm and the second arm comprise a mounting bracket having a distal portion adapted to mount the respective dental model and having a proximal portion, and a base member having a distal portion adapted to hingedly join the first arm and the second arm about the pivot axis, and a proximal portion adapted to couple to the proximal portion of the respective mounting bracket. The kit further includes a set of inspection tools capable of checking the at least one measurable element against allowable tolerances. The set of inspection tools comprise a first measurement device and a second measurement device.

BRIEF DESCRIPTION OF THE DRAWINGS

The present disclosure is illustrated by way of example, and not by way of limitation, in the figures of the accompanying drawings.

DETAILED DESCRIPTION

Figure 1:
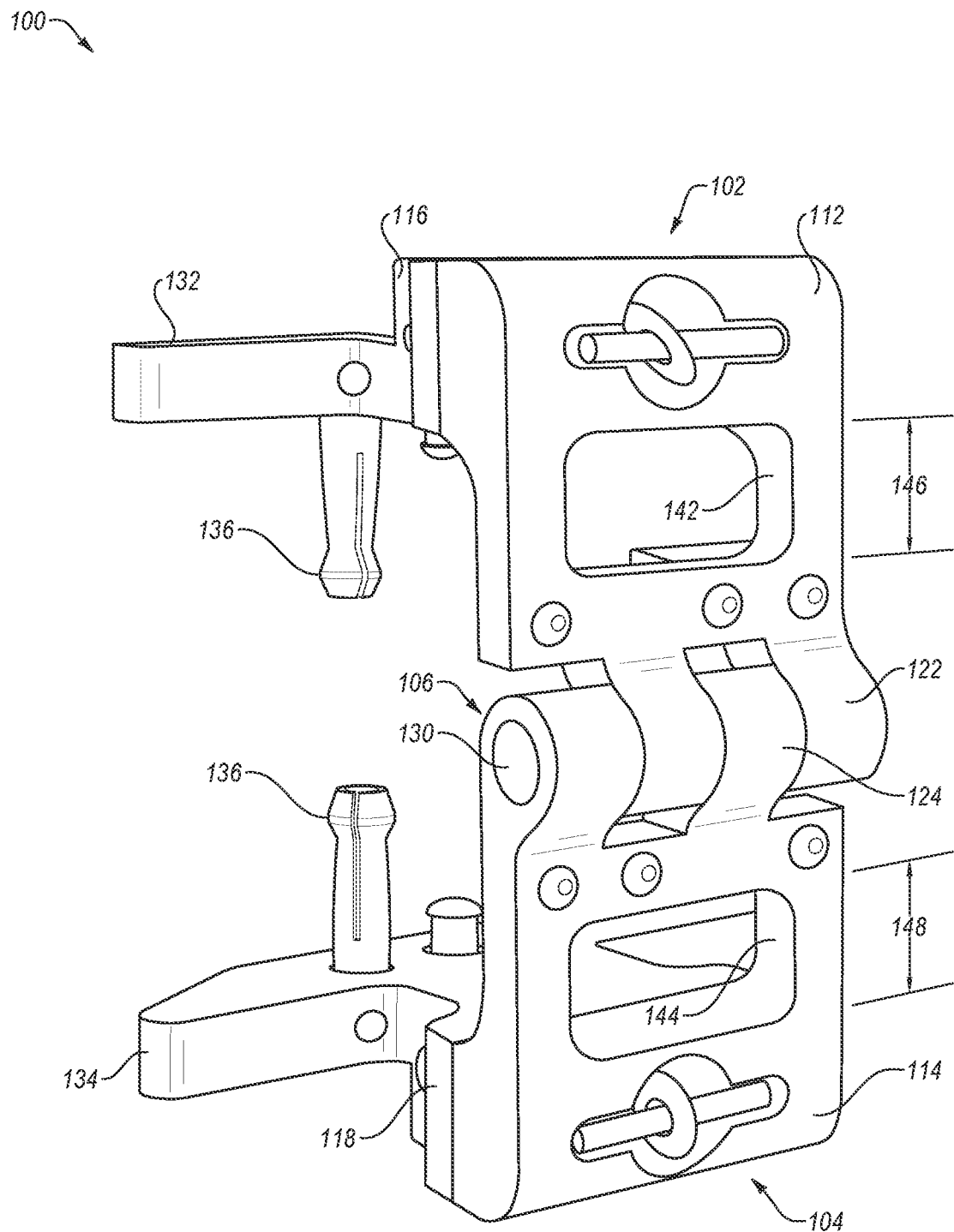
FIG. 1 illustrates an example articulator, in accordance with embodiments of the present disclosure.

An articulator assists in the accurate fabrication of the biting surfaces of plastic orthodontic aligners, as well as removable prosthodontic appliances (dentures), fixed prosthodontic restorations (implants, crowns, bridges, inlays and onlays) and other orthodontic and/or prosthodontic appliances. An articulator is a mechanical hinged device to which dental models (e.g., casts or molds) of the maxillary (upper) and mandibular (lower) jaw are fixed, reproducing some or all the movements of the mandible in relation to the maxilla. The human maxilla is fixed and the scope of movement of the mandible is dictated by the position and movements of the bilateral temporomandibular joints, which can rotate and translate forward when the mouth is opened.

Although the dental models of the upper and lower jaw are traditionally made from plaster or similar materials, advancements in 3D printing have made printing dental models a viable alternative. However, 3D printers vary in quality, and need periodic calibration. As such, the models generated by 3D printers may be subject to deformations, distortions, inaccuracies, and so forth. Furthermore, 3D printed models are generally fabricated from plastic-based materials, which may deform over time due to, for example, heat and humidity. Consequently, the dental models generated by the 3D printers may be inaccurate, resulting in the creation of defective orthodontic appliances. Furthermore, 3D printers may have greater accuracy when printing in some regions than in other regions of a printer bed. For example, regions of 3D printed objects that are near a center of a print bed may be more accurate than regions of 3D printed objects that are near a peripheral of the print bed.

Aspects and implementations of the present disclosure address these and other shortcoming of existing technology by providing an articulator capable of verifying the accuracy of 3D printed dental models using a built-in measurement device. The built-in measurement device can be any type of mechanical measurement device, such as a go/no-go gauge, a ruler, a caliper, a micrometer, a feeler gauge, a bore gauge, a depth gauge, and so forth. Accordingly, each dental model generated by the 3D printer can include one or more measurement elements to be evaluated by the built-in measurement device. For example, the measurement element(s) can include one or more protrusions, notches, bores, designs (e.g., spaced lines), fins, or any other feature capable of being measured by a mechanical measurement device. Accordingly, the built-in measurement device can be used to evaluate 3D printed dental models to determine whether the dental model was fabricated (e.g., 3D printed) to within a pre-specified tolerance (hereafter "accurately fabricated"). In some embodiments, the articulator does not include a built-in measurement device. Instead, a kit may be provided to customers of the articulator that includes the articulator as well as a set of inspection tools (e.g., one or more gauges or other measurement devices) that are separate from the articulator. Additionally, in some embodiments a kit may be provided to customers that include an articulator with a built-in measurement device and one or more additional gauges or other measurement devices that are separate from the articulator.

In some embodiments, the measurement elements can be strategically placed during design of the dental model based on the section of the dental model that requires accuracy verification, based on one or more types of dental treatment to be performed, based on properties of the dental model (e.g., jaw width, edentulous regions, tooth size, tooth placement, tooth orientation, presence and/or location of preparation teeth, and so on). In an example, dental models may require only a specific section to be used during creating or testing of orthodontic or prosthodontic appliances. Thus, if deformations or distortions occur in a different section of the dental model, measuring said section can cause the practitioner to discard a usable dental model. By placing the measurement element only at the desired section, the dental practitioner can ensure the accuracy of the orthodontic appliances created using said section, while preventing potential wasteful re-fabrication of the dental model. For example, if the dental model is to be used to determine whether a crown was properly fabricated, the measurement elements can be placed adjacent to the location where the crown is to be placed on the dental model (e.g., next to the section of the missing tooth on the dental model). Thus, the built-in measurement device can be used to verify the accuracy of the desired section of the 3D printed dental model without evaluating irrelevant sections.

In some embodiments, the built-in measurement device is a go/no-go gauge. The go/no-go gauge is an inspection tool having two gauges (a go gauge and a no-go gauge) which can be used to check an element of an apparatus against allowed tolerances using a go/no-go test. The go/no-go test includes two prongs; the first prong includes determining whether the element of the apparatus passes a first test (go test), and the second prong includes determining whether the same element of the apparatus fails a second test (no-go test). For example, the element can include a protrusion of a particular diameter, whereby the protrusion is designed to be insertable into the go gauge and uninsertable into the no-go gauge. If both tests are satisfied, then the dental model can be considered to be fabricated (e.g., 3D printed) to within a pre-specified tolerance.

Hereafter, the go/no-go gauge will be used as an exemplary example of the built-in measurement device. However, as discussed above, the articulator can be fabricated with one or more of any type of built-in measurement device.

Embodiments are discussed herein with regards to 3D printed dental models, which include physical 3D dental models of upper jaws (also referred to as upper dental arches) and lower jaws (also referred to as lower dental arches). However, embodiments discussed with reference to 3D printed dental models are also applicable to other dental models that are created using other methods and means. Accordingly, it should be understood that any reference to 3D printed dental models also applies to other types of dental models.

FIG. 1 illustrates an example articulator 100 according to embodiments of the present disclosure. Articulator 100 includes an upper arm 102 and a lower arm 104 joined together by a hinge 106 with respect to a pivot axis. Each arm 102, 104 comprises a generally L-shaped form when viewed from the side along the pivot axis, the arms of the L comprising base members 112, 114 and respective mounting brackets 116, 118. The mounting brackets 116, 118 are configured for mounting a respective dental model thereto in operation of the articulator. The bracket defines a longitudinal axis substantially parallel to the occlusal plane of the corresponding dental model and orthogonal to the pivot axis.

The base members 112, 114 include respective hinge ends 122, 124 that are pivotable with respect to the pivot axis. Each hinge end 122, 124 includes hinge loops, spaced to allow the hinge loops of the other arm to be coaxially aligned therewith, and which cooperate with a pivot pin 130, allowing pivoting of each arm 102, 104 with respect to the hinge ends 122, 124. Pivot stops (not shown) are configured for limiting the relative rotation of the arms 102, 104 towards each other such to prevent the respective dental models (when the dental models are mounted to the arms 102, 104, respectively) being pressed against each other with undue force or beyond the occlusal plane. Thus, articulator 100 allows the dental models to mutually touch at the occlusal plane, but prevents further rotation of the arms 102, 104 towards one another, while permitting rotation away from one another.

The mounting brackets 116, 118 enable the dental models to be mounted in a cantilevered manner. In particular, the mounting brackets 116, 118 have a generally T-shaped plan form (when viewed from above), and include bars 132, 134, respectively. Bars 132 and 134 each include a pair of transversely spaced, substantially parallel engagement snap fit prongs 136 that are configured for reversibly engaging with respect to the respective apertures of the corresponding dental model. Each prong 136 includes a cylindrical base that projects from the surface of the bars 132, 134 and a resilient portion, cantilevered from the base, and which includes multiple (in this embodiment, four) elongate resilient elements circumferentially arranged with respect to the base and circumferentially spaced via longitudinal gaps. The elements each include a sloping portion that radially slopes towards the longitudinal axis of each prong 136, and an enlarged portion at the free end of the prong 136 that radially projects further outwardly than the perimeter of base when the elements are in the datum, unstressed condition. The enlarged portion comprises a conical or rounded free end, a waist portion defining the radially outermost surfaces of enlarged portions, and an engaging shoulder adjacent the sloping portion. Thus, together the elements form a substantially frustoconical or pyramidal portion including the sloping portions, and a bulging portion (including the enlarged portions) having a rounded free end.

In the embodiment illustrated by FIG. 1, articulator 100 includes go gauge 142 and no-go gauge 144 (collectively referred to as "go/no-go gauge"). Go gauge 142 can include a first tolerance 146, and no-go gauge 144 can include a second tolerance 148. The go/no-go gauge can be used as an inspection tool used to check an element of the dental model against allowed tolerances using a go/no-go test. The go/no-go test includes two prongs; the first prong includes determining whether the element of the dental model is capable of insertion into go gauge 142 (i.e., whether the element of the dental model fits within the first tolerance 146), and the second prong includes determining whether the element of the dental model is not insertable into no-go gauge 144 (i.e., whether the element of the dental model does not fit within the second tolerance 148). If both tests are satisfied, then the dental model can be considered printed to within a certain tolerance. As will be explained in detail below, the element of the dental model may include a protrusion designed into the dental model, the base of the dental model itself, or any other measurable element or aspect of the dental model.

Though articulator 100 is shown to have a specific design, any type of articulator that includes one or more built-in measurement device may be used in embodiments. The articulators may have different types of hinge mechanisms, different types of attachment mechanisms or mounting brackets, and so on. For example, an articulator may include a dovetail mounting bracket with a male or female dovetail element that engages with a female or male dovetail element on a dental model. Additionally, the articulator may be a fixed hinge articulator, a fully adjustable articulator, a semi-adjustable articulator, and so on. Additionally, though the articulator is shown with a first measurement device (go gauge 142) on the upper arm 102 and a second measurement device (no-go gauge 144) on the lower arm 104, all measurement devices may be located on the upper arm 102 or on the lower arm 104. Additionally, or alternatively, the upper arm 102 may include multiple measurement devices and/or the lower arm 104 may include multiple measurement devices.

Figure 2:
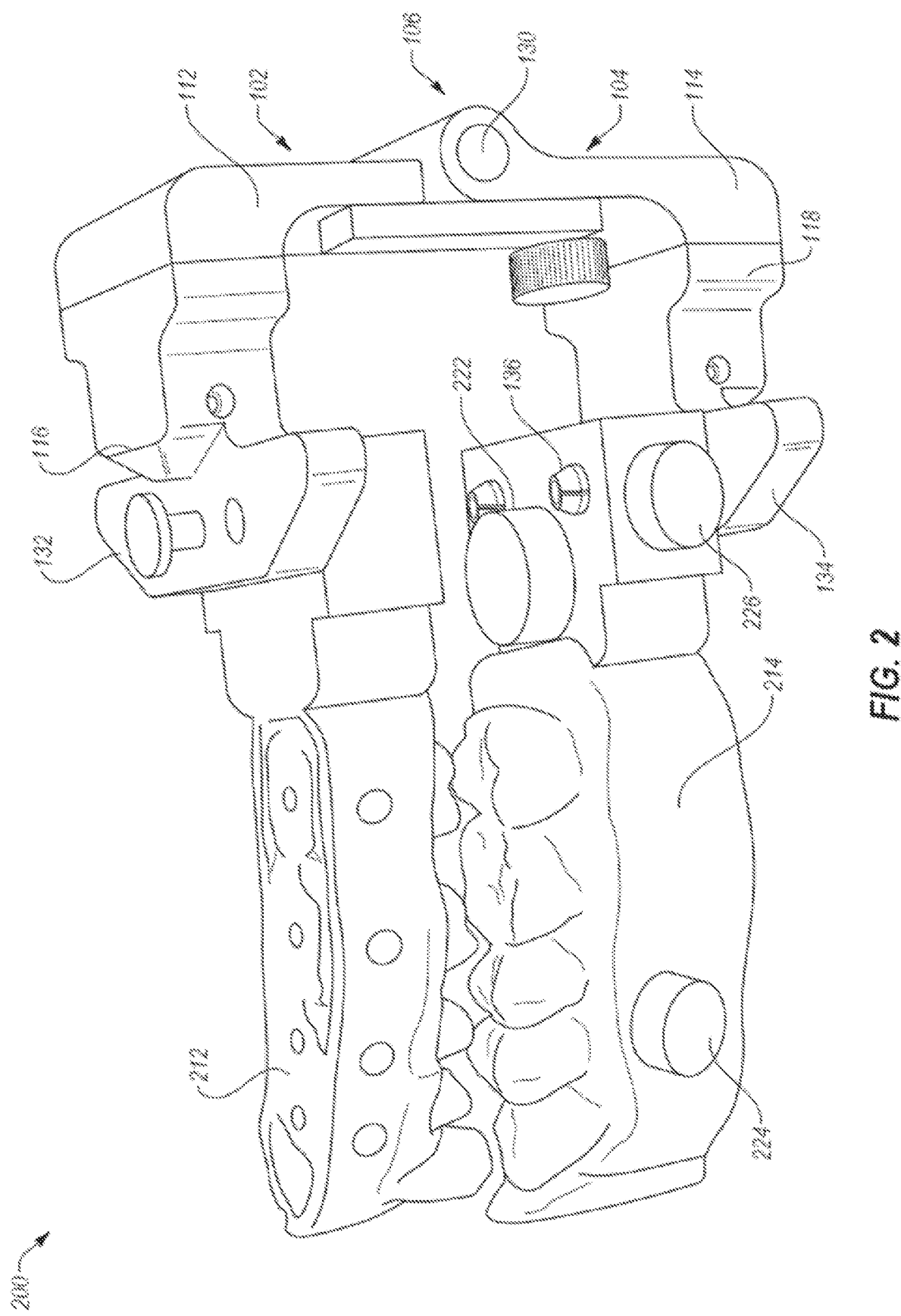
FIG. 2 illustrates example dental models coupled to the example articulator, in accordance with embodiments of the present disclosure.

FIG. 2 illustrates example dental models 212 and 214 coupled to articulator 100, according to embodiments of the present disclosure. Dental model 212 is 3D printed cast of a human maxillary (upper) jaw and dental model 214 is a 3D printed cast of a human mandibular (lower) jaw. Dental model 214 includes three protrusions 222, 224, 226. By way of example, protrusions 222, 224, 226 are cylindrical protrusions. However, those skilled in the art would understand that protrusions 222, 224, 226 can be any type of protrusions, including square, rectangular, triangular, etc. protrusions. Each protrusion 222, 224, 226 can be designed to be of a particular size (e.g., diameter, length, etc.), whereby protrusions 222, 224, 226 are designed to be insertable into the go gauge 142, and uninsertable into the no-go gauge 144. Each protrusion can be strategically positioned to measure the accuracy of the section adjacent to the protrusion. In particular, 3D printed models may have some sections that are accurately fabricated (fabricated to within a desired tolerance), and other sections that are inaccurately fabricated (fabricated outside the desired tolerance). In addition, some sections of the 3D printed models may experience deformations, distortions, etc. Strategically positioning the protrusion(s) at locations on the dental model requiring accurate fabrication (e.g., at the section where the patient needs a crown) allows the dental practitioner to verify said section using the go/no-go gauge. Each of the protrusions 222, 224, 226 illustrated in FIG. 2 is positioned by way of illustrative example. Accordingly, any number of protrusions can be positioned at any section or location on dental model 212 and/or dental model 214.

In an exemplary example, the go tolerance 146 of go gauge 142 can be 10.05±0.01 mm, and the no-go tolerance 148 of no-go gauge 144 can be 9.95±0.01 mm. Accordingly, each protrusions 222, 224, 226 can be designed to have a measurement of 10±0.025 mm, thus allowing each protrusion 222, 224, 226 to be insertable into the go gauge 142, and uninsertable into the no-go gauge 144. Responsive to the dental model 214 being inaccurately fabricated, or experiencing deformation or distortion at one or more locations, the professional can determine whether and where such issues exist using the protrusions 222, 224, 226 and the go/no-go gauge.

In some embodiments, two protrusions may be positioned on the dental model to measure a distance of between the two protrusions (e.g., the distance between protrusion 224 and 226) to determine whether the section of the dental model between the two protrusions was accurately fabricated, is distorted or deformed, etc. The distance may be measured by a measurement device (e.g., a ruler, a caliper, go gauge, no-go gauge, etc.) built into articulator 100 (not shown) or by an external measurement device. In some embodiments, the external measurement device can be attached to articulator 100 via, for example, a chain, a rope, etc.

In some embodiments, different sized protrusions (or any type of measurement elements) for different measurement devices can be included. For example, protrusion 222 can be of a first size to be verified by a first measurement device (e.g., the go/no-go gauge), and protrusions 224 and 226 can be of a second size, whose distance can be verified by a second measurement device (e.g., a ruler, a caliper, additional go/no-go gauge, etc.).

Figure 3:
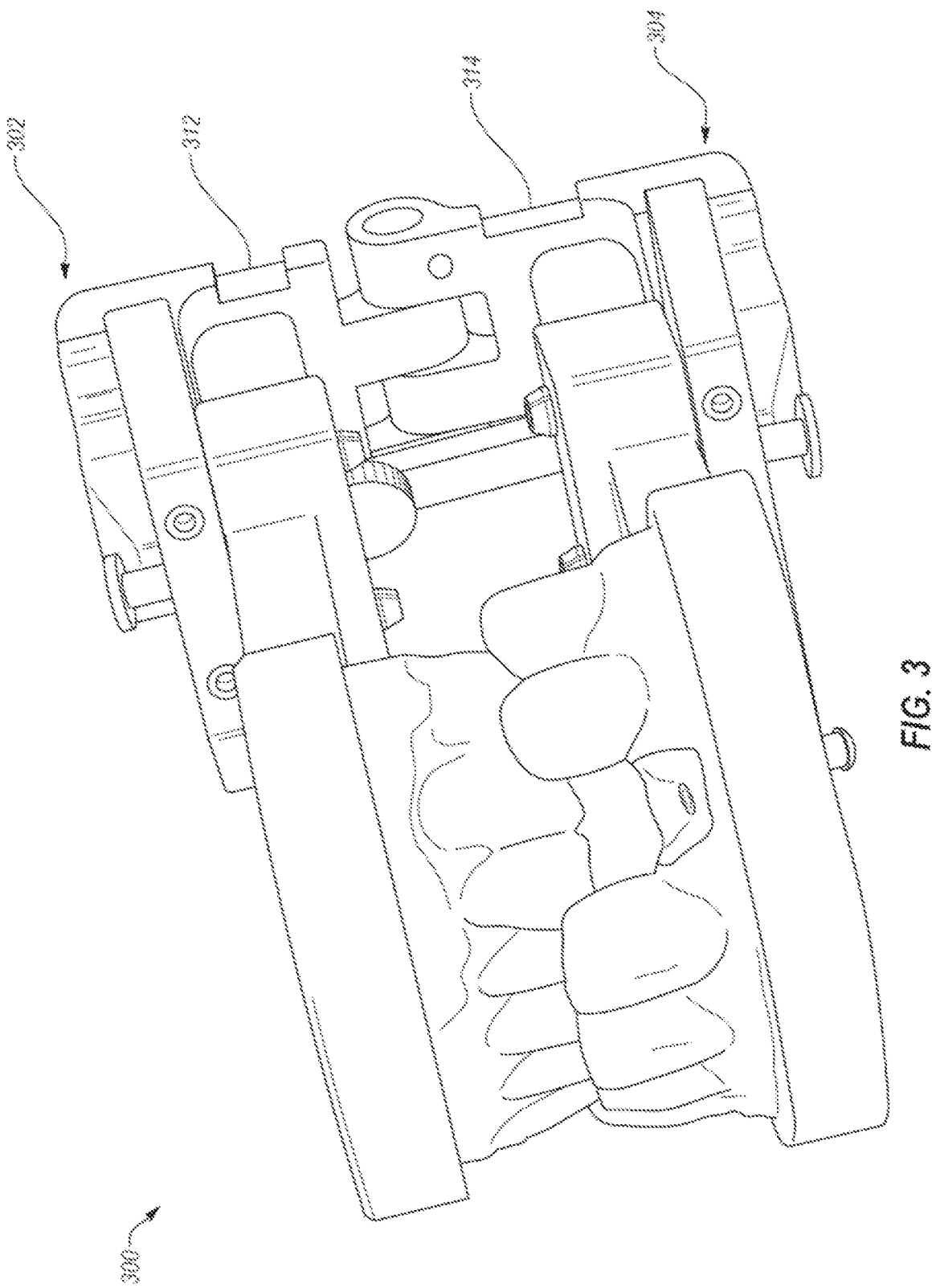
FIG. 3 illustrates another example articulator, in accordance with embodiments of the present disclosure.

FIG. 3 illustrates another example articulator 300, according to embodiments of the present disclosure. Articulator 300 may be similar in one or more aspects to articulator 100. Articulator 300 includes go gauge 312 and no-go gauge 314 (collectively referred to as "go/no-go gauge"). As illustrated, go gauge 312 includes a square notch in upper arm 302, and no-go gauge 314 includes a square notch in lower arm 304. Go gauge 312 can include a go tolerance (i.e., the spacing between the sides of the square notch of go gauge 312), and no-go gauge 314 can include a no-go tolerance (i.e., the spacing between the sides of the square notch of no-go gauge 314). The go/no-go gauge can be used to test a protrusion to verify that the dental model (or a section of the dental model) was fabricated to within a pre-specified tolerance.

Figure 4:
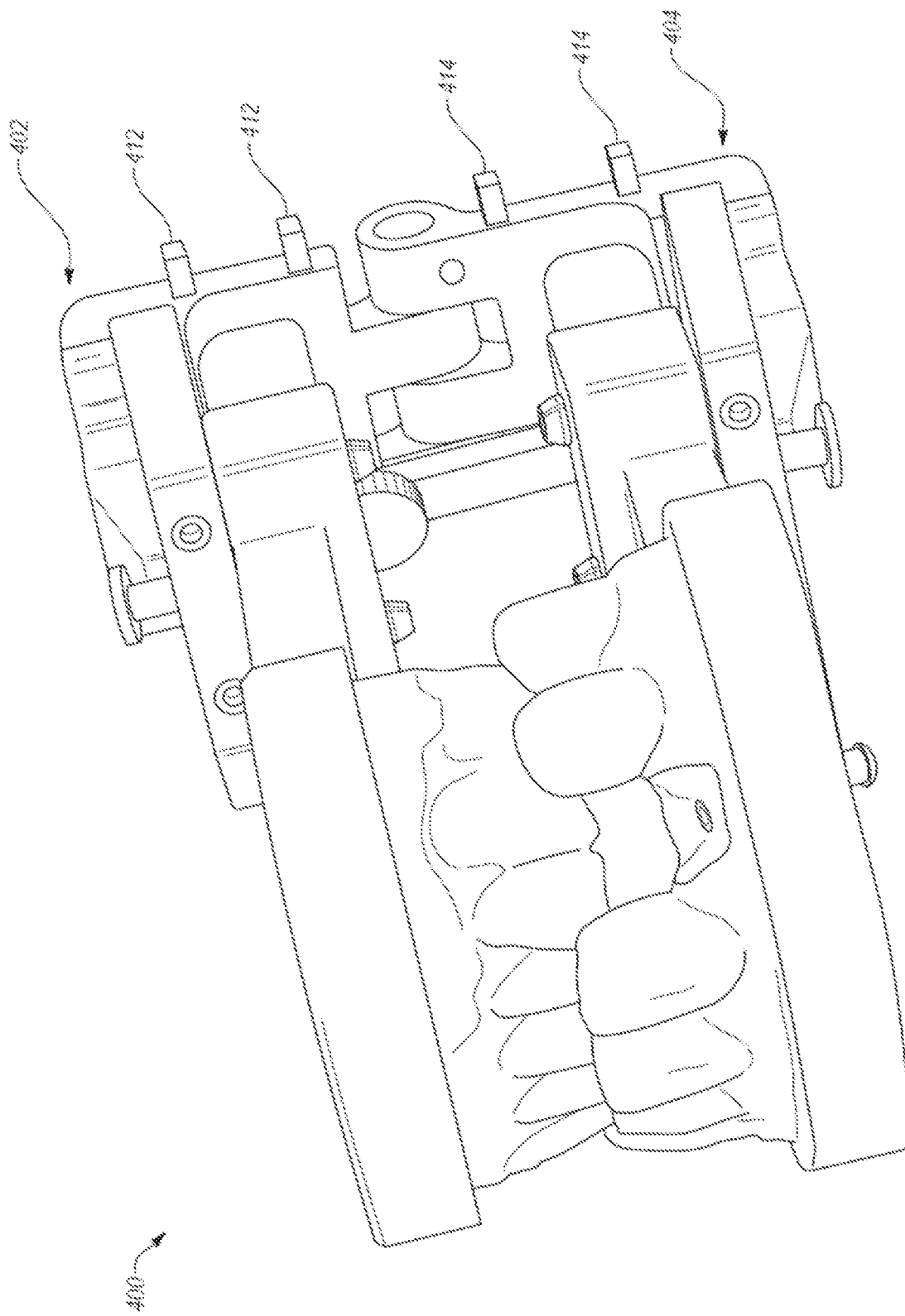
FIG. 4 illustrates another example articulator, in accordance with embodiments of the present disclosure.

FIG. 4 illustrates another example articulator 400, according to embodiments of the present disclosure. Articulator 400 may be similar in one or more aspects to articulator 100. Articulator 400 includes go gauge 412 and no-go gauge 414 (collectively referred to as "go/no-go gauge"). As illustrated, go gauge 412 includes two protrusions in upper arm 402, and no-go gauge 414 includes two protrusions in lower arm 404. Go gauge 412 can include a go tolerance (i.e., the spacing between the two protrusions of go gauge 412), and no-go gauge 414 can include a no-go tolerance (i.e., the spacing between the two protrusions of no-go gauge 414). The go/no-go gauge can be used to test a protrusion to verify that the dental model (or a section of the dental model) was fabricated to within a pre-specified tolerance.

Figure 5:
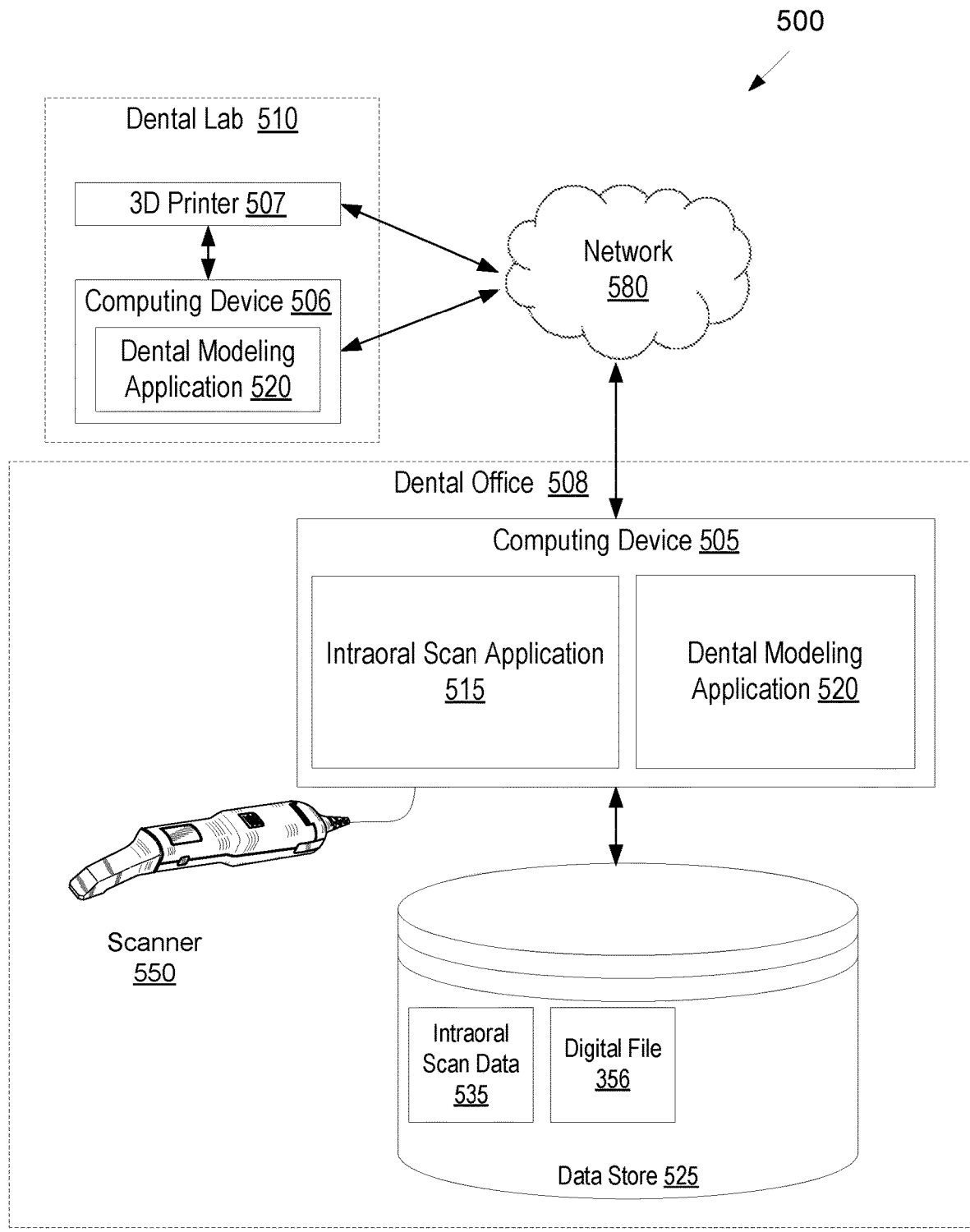
FIG. 5 illustrates one embodiment of a system for generating design models of human jaws and for fabricating dental models from the design models.

FIG. 5 illustrates one embodiment of a system for generating design models of human jaws and for fabricating dental models from the design models. System 500 includes a dental office 508 and a dental lab 510. The dental office 508 and the dental lab 510 each include a computing device 505, 506, where the computing devices 505, 506 may be connected to one another via a network 580. The network 580 may be a local area network (LAN), a public wide area network (WAN) (e.g., the Internet), a private WAN (e.g., an intranet), or a combination thereof.

Computing device 505 may be coupled to an intraoral scanner 550 (also referred to as a scanner) and/or a data store 525. Computing device 506 may also be connected to a data store (not shown). The data stores may be local data stores and/or remote data stores. Computing device 505 and computing device 506 may each include one or more processing devices (e.g., processors), memory, secondary storage, one or more input devices (e.g., such as a keyboard, mouse, tablet, and so on), one or more output devices (e.g., a display, a printer, etc.), and/or other hardware components.

Intraoral scanner 550 may include a probe (e.g., a hand held probe) for optically capturing three-dimensional structures. The intraoral scanner 550 may be used to perform an intraoral scan of a patient's oral cavity. An intraoral scan application 515 running on computing device 505 may communicate with the scanner 550 to effectuate the intraoral scan. A result of the intraoral scan may be intraoral scan data 535 that may include one or more sets of intraoral images. Each intraoral image may be a two-dimensional (2D) or 3D image that includes height information (e.g., a height map) of a portion of a dental site, and may include x, y and z information.

According to an example, a user (e.g., a practitioner) may subject a patient to intraoral scanning. In doing so, the user may apply scanner 550 to one or more patient intraoral locations. The scanning may be divided into one or more segments. As an example, the segments may include a lower buccal region of the patient, a lower lingual region of the patient, an upper buccal region of the patient, an upper lingual region of the patient, one or more preparation teeth of the patient (e.g., teeth of the patient to which a dental device such as a crown or other dental prosthetic will be applied), one or more teeth which are contacts of preparation teeth (e.g., teeth not themselves subject to a dental device but which are located next to one or more such teeth or which interface with one or more such teeth upon mouth closure), and/or patient bite (e.g., scanning performed with closure of the patient's mouth with the scan being directed towards an interface area of the patient's upper and lower teeth). Via such scanner application, the scanner 550 may provide intraoral scan data 535 to computing device 505. The intraoral scan data 535 may be provided in the form of intraoral image data sets, each of which may include 2D intraoral images and/or 3D intraoral images of particular teeth and/or regions of an intraoral site. In one embodiment, separate image data sets are created for the maxillary arch (upper jaw), for the mandibular arch (lower jaw), for a patient bite, and/or for each preparation tooth. Alternatively, a single large intraoral image data set is generated (e.g., for a mandibular and/or maxillary arch). Such images may be provided from the scanner to the computing device 505 in the form of one or more points (e.g., one or more pixels and/or groups of pixels). For instance, the scanner 550 may provide such a 3D image as one or more point clouds. The intraoral images may each comprise a height map that indicates a depth for each pixel.

The manner in which the oral cavity of a patient is to be scanned may depend on the procedure to be applied thereto. For example, if an upper or lower denture is to be created, then a full scan of the mandibular or maxillary edentulous arches may be performed. In contrast, if a bridge is to be created, then just a portion of a total arch may be scanned which includes an edentulous region, the neighboring preparation teeth (e.g., abutment teeth) and the opposing arch and dentition. Additionally, the manner in which the oral cavity is to be scanned may depend on a doctor's scanning preferences and/or patient conditions.

By way of non-limiting example, dental procedures may be broadly divided into prosthodontic (restorative) and orthodontic procedures, and then further subdivided into specific forms of these procedures. Additionally, dental procedures may include identification and treatment of gum disease, sleep apnea, and intraoral conditions. The term prosthodontic procedure refers, inter alia, to any procedure involving the oral cavity and directed to the design, manufacture or installation of a dental prosthesis at a dental site within the oral cavity (intraoral site), or a real or virtual model thereof, or directed to the design and preparation of the intraoral site to receive such a prosthesis. A prosthesis may include any restoration such as crowns, veneers, inlays, onlays, implants and bridges, for example, and any other artificial partial or complete denture. The term orthodontic procedure refers, inter alia, to any procedure involving the oral cavity and directed to the design, manufacture or installation of orthodontic elements at a intraoral site within the oral cavity, or a real or virtual model thereof, or directed to the design and preparation of the intraoral site to receive such orthodontic elements. These elements may be appliances including but not limited to brackets and wires, retainers, clear aligners, or functional appliances.

For many prosthodontic procedures (e.g., to create a crown, bridge, veneer, etc.), an existing tooth of a patient is ground down to a stump. The ground tooth is referred to herein as a preparation tooth, or simply a preparation. The preparation tooth has a margin line (also referred to as a margin line), which is a border between a natural (unground) portion of the preparation tooth and the prepared (ground) portion of the preparation tooth. The preparation tooth is typically created so that a crown or other prosthesis can be mounted or seated on the preparation tooth. In many instances, the margin line of the preparation tooth is subgingival (below the gum line). While the term preparation typically refers to the stump of a preparation tooth, including the margin line and shoulder that remains of the tooth, the term preparation herein also includes artificial stumps, pivots, cores and posts, or other devices that may be implanted in the intraoral cavity so as to receive a crown or other prosthesis. Embodiments described herein with reference to a preparation tooth also apply to other types of preparations, such as the aforementioned artificial stumps, pivots, and so on.

When a scan session is complete (e.g., all images for an intraoral site or dental site have been captured), intraoral scan application 515 may generate a design model (also referred to as a virtual 3D model) of one or more scanned dental arches (e.g., of the upper and/or lower jaw). To generate the virtual 3D model, intraoral scan application 515 may register and "stitch" or merge together the intraoral images generated from the intraoral scan session. In one embodiment, performing image registration includes capturing 3D data of various points of a surface in multiple images, and registering the images by computing transformations between the images. The 3D data may be in the form of multiple height maps or other images with height information, which may be projected into a 3D space of a 3D model to form a portion of the 3D model. The images may be integrated into a common reference frame by applying appropriate transformations to points of each registered image and projecting each image into the 3D space.

In one embodiment, image registration is performed for adjacent or overlapping intraoral images (e.g., each successive frame of an intraoral video). Image registration algorithms are carried out to register two adjacent intraoral images (e.g., two adjacent blended intraoral images) and/or to register an intraoral image with a 3D model, which essentially involves determination of the transformations which align one image with the other image and/or with the 3D model. Image registration may involve identifying multiple points in each image (e.g., point clouds) of an image pair (or of an image and the 3D model), surface fitting to the points, and using local searches around points to match points of the two images (or of the image and the 3D model). For example, intraoral scan application 515 may match points of one image with the closest points interpolated on the surface of another image, and iteratively minimize the distance between matched points. Other image registration techniques may also be used.

Intraoral scan application may repeat image registration for all images of a sequence of intraoral images to obtain transformations for each image, to register each image with the previous one and/or with a common reference frame (e.g., with the 3D model). Intraoral scan application 515 integrates all images into a single design model (virtual 3D model) by applying the appropriate determined transformations to each of the images. Each transformation may include rotations about one to three axes and translations within one to three planes.

A digital file may be generated that includes and/or is based on the design model. The digital file may include a set of instructions to be executed by a three-dimensional (3D) printer to fabricate a dental model with the at least one measurement element based on the design model. The dental model may be a physical model or mold of an upper or lower jaw represented by the design model, for example. Once the doctor (e.g., dentist) has determined that the design model is acceptable, the doctor may instruct computing device 505 to send the design model (or a digital file comprising the design model and/or instructions for a 3D printer to fabricate a dental model corresponding to the design model) to computing device 506 of dental lab 510.

Computing device 506 may include a dental modeling application 520 that may include logic for adding measureable elements (also referred to as quality control features) to the design model. Additionally, or alternatively, computing device 505 may include dental modeling application 520 that may include logic for adding measureable elements (also referred to as quality control features) to the design model.

Dental modeling application 520 includes a graphical user interface (GUI) through which a user may view and/or manipulate a design model of a dental site (e.g., of an upper or lower jaw). In one embodiment, dental modeling application 520 includes a library of measurable elements (quality control features). Each measurable element may have a predetermined shape and one or more predetermined dimensions. Some measurable elements may be pairs of features that together form a measurable element. The pair of features may have a predetermined separation between the two features of the pair of features. Different measurable elements may be associated with different types of patient indications and/or different types of prosthodontic and/or orthodontic conditions. Different measurable elements may additionally or alternatively be associated with different types of properties to be measured, such as jaw width, tooth or preparation size, a lateral dimension, a horizontal dimension, a vertical dimension, and so on.

In some embodiments, a user selects one or more measurable elements to be added to the design model. In one embodiment, the user then manually positions the selected measurable element(s) on the design model. The user may rotate the measurable element(s) about one or more axes and may move the measurable elements along one or more axes. In one embodiment, once a measurable element is selected by a user, the dental modeling application 520 automatically places the measurable element on the design model. The user may then adjust the placement of the measurable element as desired. In one embodiment, the user indicates which tooth and/or property that the measurable element is to be used to assess, and the dental modeling application automatically determines a placement of the measurable element based on the indicated tooth and/or property.

In some embodiments, dental modeling application 520 automatically selects one or more measurable elements and automatically places the measurable elements on the design model.

Once the design model is updated to include the one or more measurable elements, the design model may be saved with the included measurable elements. In one embodiment, a digital file is generated or updated, where the digital file may include the design model.

Once the design model has been updated to include the one or more measurable elements, a digital file containing instructions for 3D printing a dental model that is a physical mold of the design model may be sent to a 3D printer 507. In some embodiments, 3D printer fabricates a dental model using additive manufacturing techniques (also referred to herein as "3D printing"). In some instances, stereolithography (SLA), also known as optical fabrication solid imaging, may be used to fabricate the 3D printed object. In SLA, the object is fabricated by successively printing thin layers of a photo-curable material (e.g., a polymeric resin) on top of one another. A platform rests in a bath of liquid photopolymer or resin just below a surface of the bath. A light source (e.g., an ultraviolet laser) traces a pattern over the platform, curing the photopolymer where the light source is directed, to form a first layer of the object. The platform is lowered incrementally, and the light source traces a new pattern over the platform to form another layer of the object at each increment. This process repeats until the object is completely fabricated. Once all of the layers of the object are formed, the object may be cleaned and cured.

In some embodiments, dental models may be produced using other additive manufacturing techniques. Other additive manufacturing techniques may include: (1) material jetting, in which material is jetted onto a build platform using either a continuous or drop on demand (DOD) approach; (2) binder jetting, in which alternating layers of a build material (e.g., a powder-based material) and a binding material (e.g., a liquid binder) are deposited by a print head; (3) fused deposition modeling (FDM), in which material is drawn through a nozzle, heated, and deposited layer by layer; (4) powder bed infusion, including but not limited to direct metal laser sintering (DMLS), electron beam melting (EBM), selective heat sintering (SHS), selective laser melting (SLM), and selective laser sintering (SLS); (5) sheet lamination, including but not limited to laminated object manufacturing (LOM) and ultrasonic additive manufacturing (UAM); and (6) directed energy deposition, including but not limited to laser engineering net shaping, directed light fabrication, direct metal deposition, and 3D laser cladding. In some embodiments, dental models may be fabricated using subtractive manufacturing techniques such as computer numeric control (CNC) machining, electrical discharge machining (EDM), and so on.

Once a dental model of a patient's upper jaw and a dental model of the patient's lower jaw are fabricated, these dental models may be tested using one or more measurement device, such as one or more go/no-go gauges. In particular, the one or more measurable elements that were added to the design model are included in the dental model. These measurable elements may be measured using the measurement device(s) to determine if they are within design tolerances. If the measurable elements are within the design tolerances, then the dental lab 510 may determine that the dental models are usable to manufacture and/or test one or more prosthodontic and/or orthodontic appliances (e.g., caps, bridges, aligners, etc.). In some embodiments, the measurement device(s) are integrated into an articulator onto which the dental models are placed if they are determined to be within the design tolerances.

Figure 6:
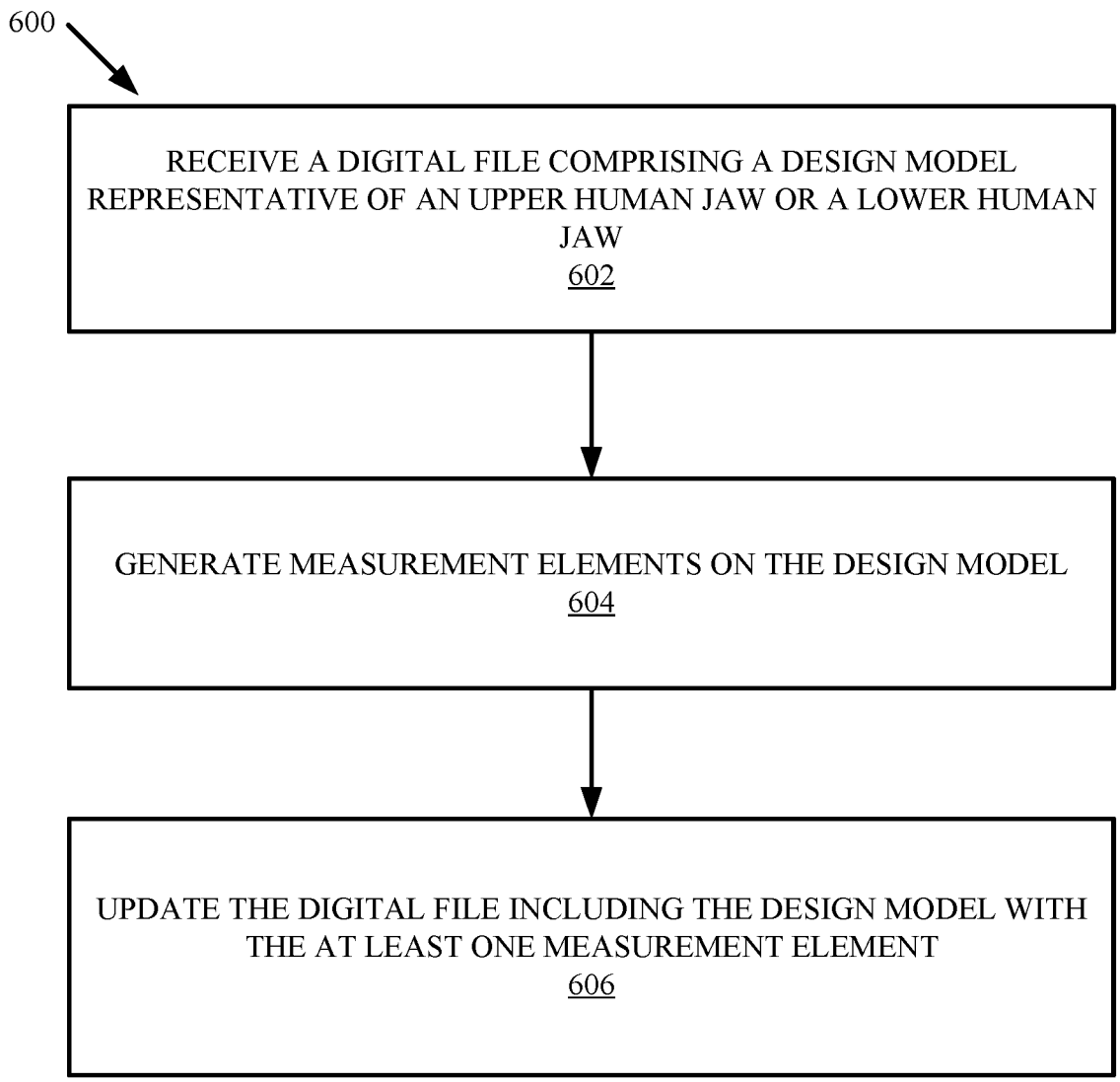
FIG. 6 is a flow diagram of an example method to fabricate dental models with measurement elements, in accordance with embodiments of the present disclosure.

FIG. 6 is a flow diagram of an example method 600 to fabricate dental models with measurement elements, in accordance with some embodiments of the present disclosure. Method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In one implementation, method 600 can be performed by computer system 600, as will be discussed in detail in FIG. 6.

At block 602 of method 600, processing logic receives a digital file comprising a design model representative of an upper human jaw or a lower human jaw. In some embodiments, the design model can be generated by a user. For example, the user can draft, using computer aided design (CAD) software, the design model using the CAD features and functions. In some embodiments, the design model can be generated by retrieving a template design model from a computing library. A computing library can be collection of non-volatile resources used by the CAD software and can include configuration data, documentation, help data, pre-written code, etc. The user can then modify the template design model, if necessary. In some embodiments, the design data can be generated by retrieving a previously generated design model. Similarly, the user can then modify the previously generated design model.

At block 604, processing logic generates measurement elements on the design model. Measurement elements includes any type of features added to the design model that can be used to verify the accuracy of a 3D printed dental model generated from the design model. In some embodiments, the measurement elements can be protrusions, notches, bores, designs (e.g., spaced lines), fins, or any other feature capable of being measured by a mechanical measurement device. In some embodiments, the measurement elements can be stored in a computing library. In some embodiments, the measurement elements can be automatically generated based on the type of design model. In particular, each type of design model may be associated with one or more of a type and/or a location of one or more measurement elements. For example, if the design model is associated with crown placement, then the processing logic can automatically generate one or more measurement elements adjacent to desired location of the crown on the dental model. In another example, if the design model is associated with plastic orthodontic aligners, then the processing logic can automatically generate one or more measurement elements in specific location to verify the accuracy of the entire dental model. In some embodiments, the type of measurement elements generated can be based on the type of articulator and/or external measurement device that is to be used with the dental model. For example, if the dental model is to be used with an articulator having a go/no-go gauge of a particular tolerance, then the processing logic can generate measurement elements of a size to be used with said go/no-go gauge. In some embodiments, rather than automatically generate the measurement elements, the processing logic can present the measurement elements to a user for selection via a graphics user interface (e.g., GUI).

At block 606, processing logic updates the digital file including the design model with the at least one measurement element. The digital file can include a set of instructions to be executed by a three-dimensional (3D) printer to fabricate a dental model with the at least one measurement element based on the design model. The at least one measurement element is measureable to perform a quality assessment of the dental model.

Figure 7:
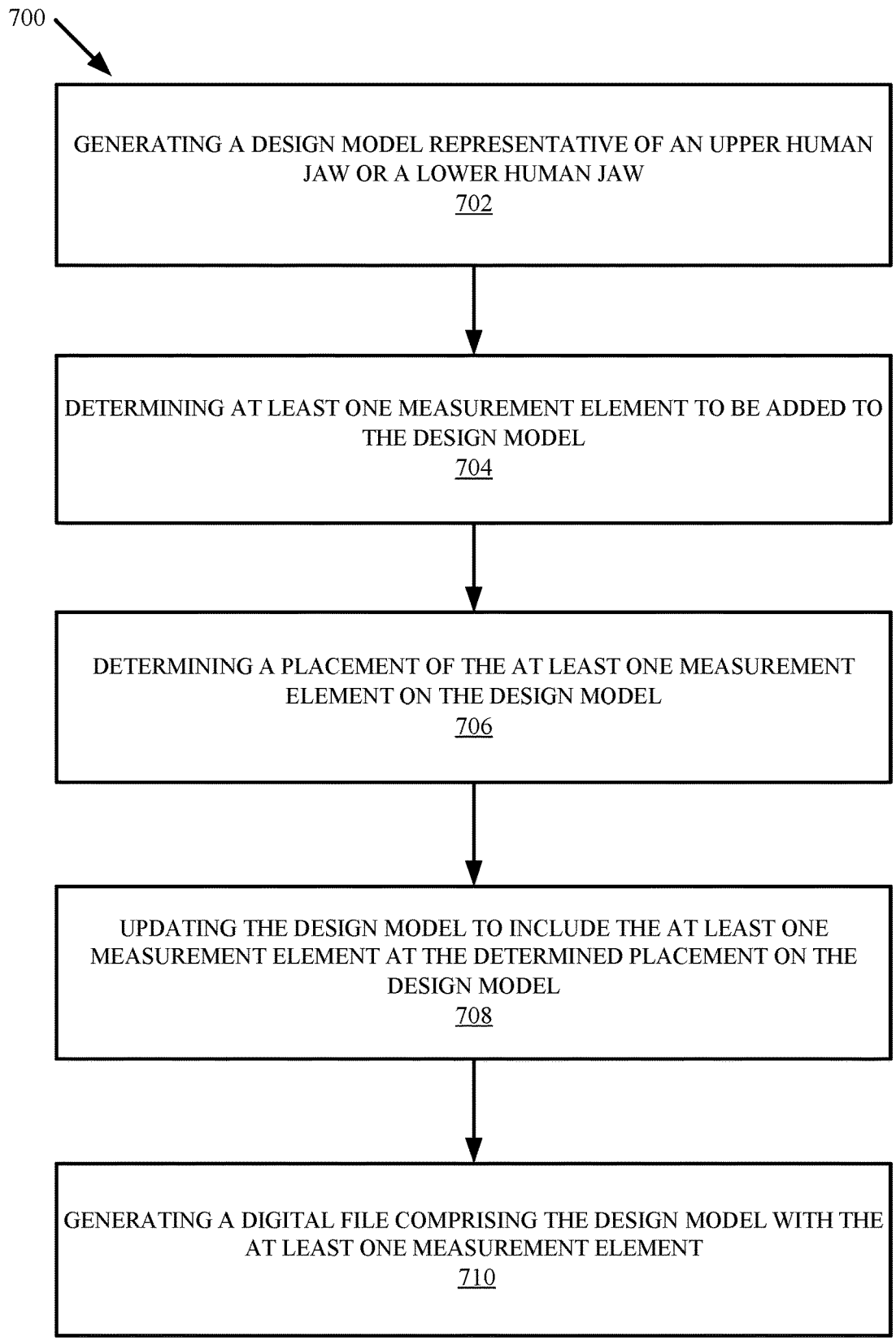
FIG. 7 is a flow diagram of another example method to fabricate dental models with measurement elements, in accordance with embodiments of the present disclosure.

FIG. 7 is a flow diagram of another example method 700 to fabricate dental models with measurement elements, in accordance with some embodiments of the present disclosure. Method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible. In one implementation, method 700 can be performed by computer system 700, as will be discussed in detail in FIG. 6.

At block 702, processing logic generates a design model representative of an upper human jaw or a lower human jaw.

At block 704, processing logic determines at least one measurement element to be added to the design model. In some embodiments, the at least one measurement element includes a protrusion capable of being measured by a mechanical measuring device. In some embodiments, processing logic can provide a library of available measurement elements in a user interface and receiving a user selection of the at least one measurement element from the library of available measurement elements.

At block 706, processing logic determines a placement of the at least one measurement element on the design model. In some embodiments, determining of the at least one measurement element to be added to the design model and the determining of the placement of the at least one measurement element on the design model can be performed automatically based on at least one of a type of design model or one or more properties of the design model. In some embodiments, processing logic can receive user input indicating the placement of the measurement element on the design model, wherein the placement of the measurement element on the design model is determined based on the user input. In some embodiments, determining the placement of the at least one measurement element on the design model includes automatically determining the placement of the measurement element on the design model that will not interfere with a functionality of a dental appliance to be fabricated using the dental model.

At block 708, processing logic updates the design model to include the at least one measurement element at the determined placement on the design model. At block 710, processing logic generates a digital file including the design model with the at least one measurement element. The digital file can include a set of instructions to be executed by a three-dimensional (3D) printer to fabricate a dental model with the at least one measurement element based on the design model. The at least one measurement element can be measureable to perform a quality assessment of the dental model.

Figure 8:
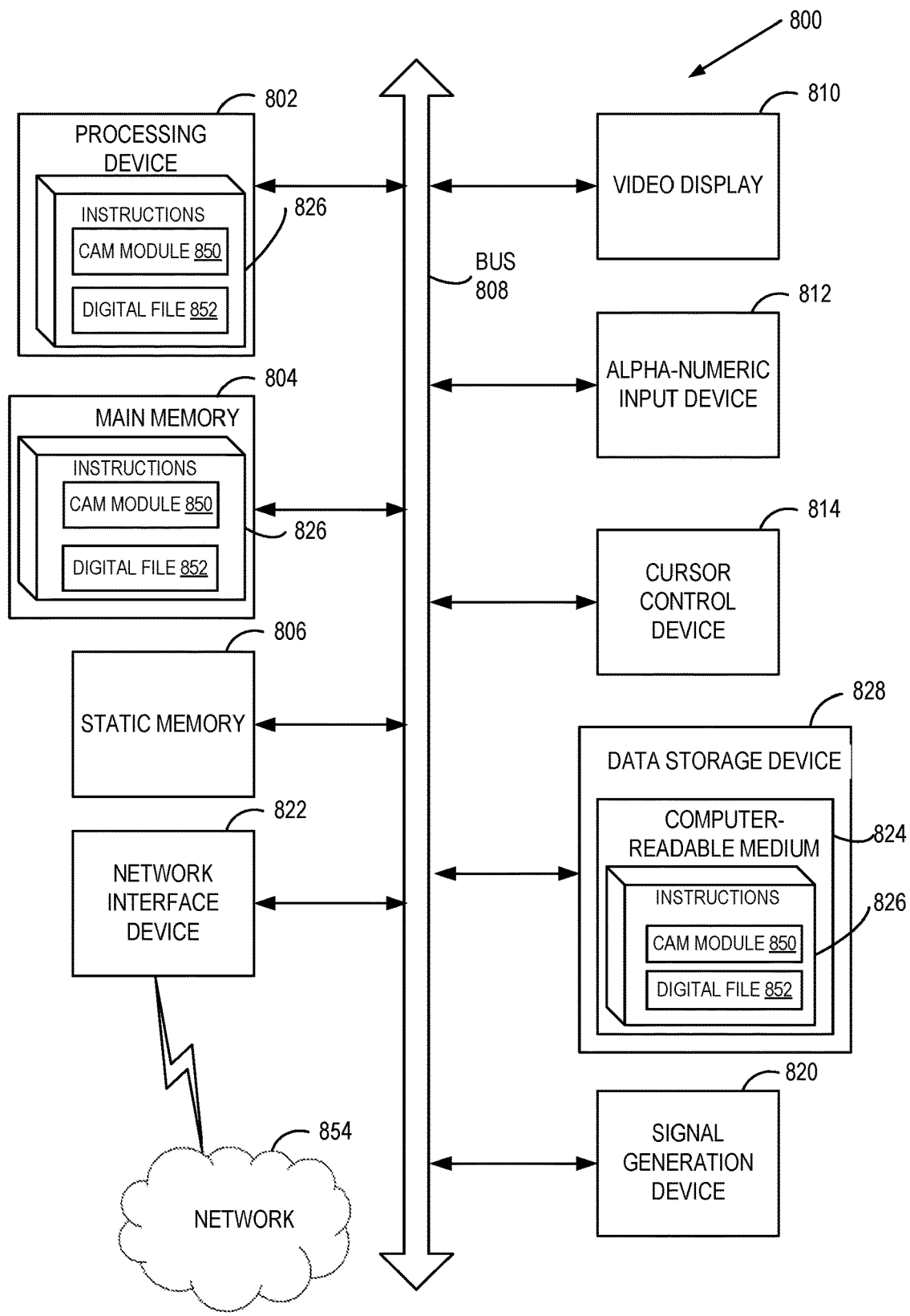
FIG. 8 illustrates a block diagram of an example computing device, in accordance with embodiments of the present disclosure.

FIG. 8 illustrates a diagrammatic representation of a machine in the example form of a computing device 800 within which a set of instructions, for causing the machine to perform any one or more of the methodologies discussed with reference to method 600 and 700. In alternative embodiments, the machine may be connected (e.g., networked) to other machines in a Local Area Network (LAN), an intranet, an extranet, or the Internet. For example, the machine may be networked to a rapid prototyping apparatus such as a 3D printer. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 800 includes a processing device 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 828), which communicate with each other via a bus 808.

Processing device 802 represents one or more general-purpose processors such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the processing logic (instructions 826) for performing operations and steps discussed herein.

The computing device 800 may further include a network interface device 822 for communicating with a network 854. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 828 may include a machine-readable storage medium (or more specifically a non-transitory computer-readable storage medium) 884 on which is stored one or more sets of instructions 826 embodying any one or more of the methodologies or functions described herein. A non-transitory storage medium refers to a storage medium other than a carrier wave or other propagating signal. The instructions 826 may also reside, completely or at least partially, within the main memory 804 and/or within the processing device 602 during execution thereof by the computer device 800, the main memory 804 and the processing device 802 also constituting computer-readable storage media.

The computer-readable storage medium 824 may also be used to store one or more virtual 3D models (e.g., design model of a dental model) in the form of digital files 852 and/or a computer aided manufacturing (CAM) module 850. The CAM module 850 may process the digital file 852 to determine the sequence of positions of a dispenser (e.g., an extruder) and/or a platform that will result in 3D printed object defined by the digital file 852. The CAM module 850 may send instructions to a 3D printer to cause the 3D printer to perform one or more of the operations of method 800. While the computer-readable storage medium 824 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent upon reading and understanding the above description. Although embodiments of the present disclosure have been described with reference to specific example embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A dental articulator comprising:
    a first arm hingedly joined to a second arm about a pivot axis, each one of the first arm and the second arm configured to mount a dental model comprising at least one measurement element; and
    an inspection tool capable of checking the at least one measurement element against allowable tolerances;
    wherein the first arm comprises:
        a first mounting bracket having a distal portion adapted to mount a first portion of the dental model and having a proximal portion; and
        a first base member having a distal portion adapted to hingedly join the first arm and the second arm about the pivot axis, a proximal portion adapted to couple to the proximal portion of the first mounting bracket, and a middle portion having a first measurement device of the inspection tool adjacent to the pivot axis, wherein the first measurement device comprises a first opening having a first dimension sized to receive the at least one measurement element, and wherein the first opening is configured such that receipt of the at least one measurement element within the first opening demonstrates that the at least one measurement element is within allowable tolerances, and failure of the first opening to receive the at least one measurement element demonstrates that the at least one measurement element is larger than the allowable tolerances; and
    wherein the second arm comprises:
        a second mounting bracket having a distal portion adapted to mount a second potion of the dental model and having a proximal portion; and
        a second base member having a distal portion adapted to hingedly join the first arm and the second arm about the pivot axis, a proximal portion adapted to couple to the proximal portion of the second mounting bracket, and a middle portion having a second measurement device of the inspection tool adjacent to the pivot axis, wherein the second measurement device comprises a second opening having a second dimension sized not to receive the at least one measurement element, and wherein the second opening is configured such that failure of the second opening to receive the at least one measurement element demonstrates that the at least one measurement element is within allowable tolerances, and receipt of the at least one measurement element within the second opening demonstrates that the at least one measurement element is smaller than the allowable tolerances.

2. The dental articulator of claim 1, wherein the inspection tool is designed to perform a go/no-go test of the at least one measurement element.

3. The dental articulator of claim 1, wherein the first measurement device comprises a first notch in a side of the first base member, and the second measurement device comprises a second notch in a side of the second base member.

4. The dental articulator of claim 3, wherein the first notch is of a first dimension and the second notch is of a second dimension.

5. The dental articulator of claim 1, wherein the first measurement device comprises a first pair of protrusions coupled to a side of the first base member and the second measurement device comprises a second pair of protrusions coupled to a side of the second base member.

6. The dental articulator of claim 5, wherein the first pair of protrusions are of a first distance from each other and the second pair of protrusions are of a second distance from each other.

7. The dental articulator of claim 1, wherein the at least one measurement element comprises a cylindrical protrusion.

8. The dental articulator of claim 1, wherein the dental model and the at least one measurement element are fabricated using a three-dimensional printer.

9. The dental articular of claim 1, wherein the inspection tool further comprises a third measurement device and a fourth measurement device, wherein the first measurement device and the second measurement device are designed to measure a first measurement element of the at least one measurement element, and wherein the third measurement device and the fourth measurement device are designed to measure a second measurement element of the at least one measurement element, wherein the first measurement element has first dimensions that are different from second dimensions of the second measurement element.

10. A kit for testing dental models, the kit comprising:
dental articulator comprising:
a first arm hingedly joined to a second arm about a pivot axis, each one of the first arm and the second arm configured to mount a dental model comprising at least one measurement element; and
a set of inspection tools capable of checking the at least one measurement element against allowable tolerances, the set of inspection tools comprising a first measurement device and a second measurement device;
wherein the first arm comprises:
a first mounting bracket having a distal portion adapted to mount a first portion of the dental model and having a proximal portion; and
a first base member having a distal portion adapted to hingedly join the first arm and the second arm about the pivot axis, a proximal portion adapted to couple to the proximal portion of the first mounting bracket, and a middle portion having a first measurement device of the inspection tool adjacent to the pivot axis, wherein the first measurement device comprises a first opening having a first dimension sized to receive the at least one measurement element, and wherein the first opening is configured such that receipt of the at least one measurement element within the first opening demonstrates that the at least one measurement element is within allowable tolerances, and failure of the first opening to receive the at least one measurement element demonstrates that the at least one measurement element is larger than the allowable tolerances; and
wherein the second arm comprises:
a second mounting bracket having a distal portion adapted to mount a second potion of the dental model and having a proximal portion; and
a second base member having a distal portion adapted to hingedly join the first arm and the second arm about the pivot axis, a proximal portion adapted to couple to the proximal portion of the second mounting bracket, and a middle portion having a second measurement device of the inspection tool adjacent to the pivot axis, wherein the second measurement device comprises a second opening having a second dimension sized not to receive the at least one measurement element, and wherein the second opening is configured such that failure of the second opening to receive the at least one measurement element demonstrates that the at least one measurement element is within allowable tolerances, and receipt of the at least one measurement element within the second opening demonstrates that the at least one measurement element is smaller than the allowable tolerances.

11. The dental articulator of claim 1, wherein a difference between an upper tolerance value of the allowable tolerances and a lower tolerance value of the allowable tolerances is approximately one-tenth of a millimeter.

* * * * *